Figure 1:
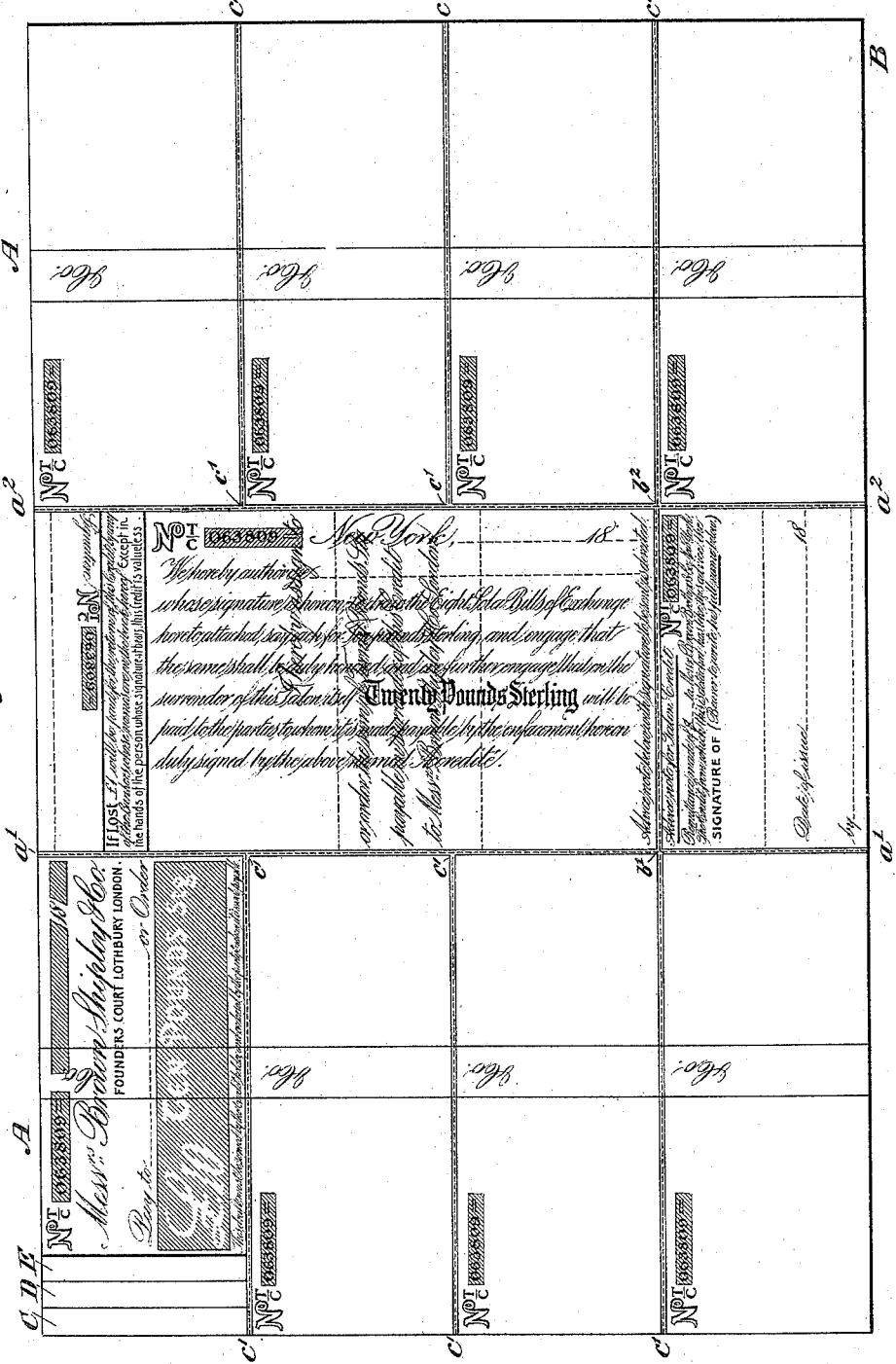

(No Model.) 2 Sheets—Sheet 1.
H. POTTER.
CIRCULAR LETTER OF CREDIT.

No. 488,221. Patented Dec. 20, 1892.

Witnesses
C. E. Ashley
H. W. Lloyd.

Inventor
Howard Potter
By his Attorney
Willard Parker Butler (No Model.)
2 Sheets—Sheet 2.

H. POTTER.
CIRCULAR LETTER OF CREDIT.

No. 488,221. Patented Dec. 20, 1892.

Witnesses
C. E. Ashley
H. W. Lloyd.

Inventor
Howard Potter
By his Attorney
Willard Parker Butler

UNITED STATES PATENT OFFICE.

HOWARD POTTER, OF NEW YORK, N. Y.

CIRCULAR LETTER OF CREDIT.

SPECIFICATION forming part of Letters Patent No. 488,221, dated December 20, 1892.

Application filed April 11, 1892. Serial No. 428,571. (No specimens.)

*To all whom it may concern:*

Be it known that I, HOWARD POTTER, a citizen of the United States, and a resident of the city, county, and State of New York, have invented a certain new and useful Improvement in Circular Letters of Credit, of which the following is a specification.

My invention relates to an improvement in circular letters of credit, and the objects of the invention are as follows: first: to secure the greatest amount of convenience in size, shape and bulk of the credit for the person carrying the same; second: to reduce the amount of labor to the party issuing the same to a minimum; third: to provide a letter of credit which will possess in a single instrument all the combined advantages of an ordinary circular note and a so called circular credit and at the same time none of the disadvantages; fourth: to secure absolute protection to the banker issuing the credit from the perpetration of the many varieties of fraud to which he is ordinarily subjected by the issuing of ordinary letters of credit, either in the form of circular notes or circular credits so-called, and fifth, to provide a credit the size of which shall be reduced and the physical appearance of which changed, in proportion to the amount available to the drawee thereunder, by the negotiation of any one or more of its separable parts.

In the ordinary conduct of banking business, "circular notes" are issued from time to time by the bankers, issuing traveling credits, which said circular notes are issued in the form of loose checks for any given amount either according to the desire of the traveler or the custom of the banker and are accompanied by a letter of credit as a separate instrument, which is directed to various bankers, and which bears the signature of the banker issuing the same. In cashing notes of this character the accompanying letter of credit, which is supposed to have been already signed by the traveler, has first to be produced and handed to the banker and the note to be cashed, then signed in his presence. In cases where the letter of credit is lost or stolen, the circular notes are intended to become at once worthless and the traveler thereupon becomes subject to very great annoyance. While the same is intended to be the case if any one or more of the notes become lost, nevertheless such a note, in the hands of unscrupulous third persons, can, by the forging of the endorsement of the person to whom the same is made payable, be often negotiated and much embarrassment and loss produced thereby. In other cases the banker issues a so-called "circular letter of credit" for a given sum directed to any number of bankers. A traveler on presentation of the same, receives from the banker any sum still available under the credit, and the latter is supposed to write the same off upon the credit, and to call upon the banker issuing the same to re-imburse him. In this case the banker issuing the credit cannot know the exact amount paid under the credit and has to rely entirely upon the honesty and integrity of his correspondents, in returning to him a draft actually signed by the traveler. Many travelers, however, object to the ordinary form of letter of credit, for the reason that the same is not as convenient for their purposes, as circular notes, and hence a credit which possesses all of the advantages of the circular note form and none of its disadvantages, is a long felt want.

In the present invention, by making the credit proper, or the so-called "talon" of the credit in the manner hereinafter indicated and described, and in attaching thereto, as integral parts thereof, checks of any desired denomination, which checks are in the form of orders on the banker issuing the credit to pay, and which cannot become operative or negotiable until signed by the traveler, and detached from the "talon" in the manner hereinafter indicated, the labor of the banker in preparing the credit is very much diminished, for the reason that he is obliged to sign the credit itself once only, as is the case in the ordinary letter of credit, instead of each note as in the case where circular notes are issued, and finally by making the letter of credit in the manner indicated, the detaching of each one of the integral parts thereof, operates to write off automatically from the credit such portion thereof as has been actually drawn, and as a result thereof the part for which value is given, after being actually detached, must be returned to the banker for payment, thus affording him a voucher possessing all the security for payment afforded by the ordinary circular note in distinction to that offered by the ordinary letter of credit.

Again in certain cases bankers have been fraudulently induced to pay circular notes upon representations that letters of credit to accompany the same were in existence, when no such letters existed. In the present invention this species of fraud is impossible, by reason of the fact that on the return of any one of the checks forming part of the letter of credit, the banker receiving the same can at once perceive not merely what detached part of the original instrument he has before him, but also that the original instrument must actually exist or have actually existed, and payments on account thereof write themselves off automatically, so to speak, from the full amount for which the credit is issued.

A further advantage of this form of credit is that the traveler will be relieved from the very serious trouble and risk of carrying two separate documents, as he is now obliged to carry in the case of the ordinary circular notes.

The invention will be best understood by reference to the accompanying two sheets of drawings, in which Figure 1 shows the front of the credit and the checks attached, and Fig. 2 the back of the same.

Similar letters refer to similar parts throughout the several views.

In the drawings A A represent a rectangular sheet of paper, perforated or divided by the two vertical lines $a'$ $a'$ and $a^2$ $a^2$ in the manner shown in Figs. 1 and 2. The space between these two vertical lines is devoted or made applicable on the front of the instrument, as shown in Fig. 1 to the obligation of the banker issuing the credit. An additional dividing or perforated line $b'$ $b^2$ crosses the space between the line $a'$ $a'$ and $a^2$ $a^2$ in the manner shown in Figs. 1 and 2, and the space $a'$ $b'$, $b^2$ $a^2$ is used for the "advice note" portion of the credit, in which the bearer of the credit is required to write his name under the words "signature of" placed at any convenient point, and which also bears the date of issue and any other information with reference to the issuing of the credit, not found upon the main portion of the obligation. The remaining portions of the sheet of paper are devoted, as shown in Fig. 1, to any convenient number of checks, which are arranged with reference to the obligation itself in any convenient manner, and connected by perforated or straight lines so as to be removed by tearing or cutting.

In Fig. 1, four checks are shown on either side of the obligation, separated from each other by straight or dotted lines, $c'$ $c'$, &c. so that they can be torn off. These checks may be of convenient size, according to the size of the paper used, and bear any convenient writing or engraving or printing. In the drawings the four checks shown on either side of the principal obligation, are numbered in any convenient manner with reference to the number of the credit, and each check bears the number of the credit. The upper left-hand check shown in Fig. 1 is filled out to show the general appearance of such a check. It contains on its face at one end three blank spaces C, D and E into which directions for signing and detaching the check as may be directed by the banker negotiating it, can be inserted in any desired languages, according to the countries in which the credit is to be used. On its face it has an order on the banker issuing the credit, to pay, in any desired words, and a blank may be printed vertically across the face of the check for "crossing" the same in the manner current in Great Britain, as shown in Fig. 1.

At the upper end of the main obligation a small space may be left, containing, as shown, the number of the credit, with a line for further signature of the bearer, to be filled in on delivery of the credit to him. The lettering and writing upon this portion of the obligation is inverted, with reference to the other printed or written portions of the credit, and the object of arranging the lettering and writing in this particular manner is to prevent the signature of the bearer of the credit, after it has been written upon the same, from being seen by the person signing the checks attached to the credit, in the presence of the banker, in such a way that he can copy the signature, so affording additional protection against fraudulent negotiation of the checks. An assignment of the credit may be printed across the face of the main obligation, as shown in Fig. 1, for use if desired. On the reverse side of the credit, as shown in Fig. 2, the indication list of bankers with whom the same may be available, will be printed, arranged in any convenient manner upon the back of the main obligation in the central portion of the paper, as shown between the dotted lines $a'$ $a'$ $a^2$ $a^2$ in that figure.

The back of the separate checks may each contain a certificate, to be signed by the banker cashing the same substantially in the manner indicated on the right-hand upper check of Fig. 2 within the lines $d$ $d$ as shown. This certificate states, the fact that the check was signed and detached in the presence of the banker signing the same or any other desired facts relative to the negotiation of the checks and in this way the banker cashing the checks becomes personally responsible to the banker issuing the credit for the proper fulfillment of all the formalities attendant upon the negotiation of each particular check, thus affording the banker issuing the credit an additional safeguard and protection against fraud. Of course the arrangement of the check with reference to the "talon," the names of the bankers on the indication list, the phraseology of the checks, the directions as to cashing the same, the wording of the main obligation and of the advice note at the bottom of the same, and in fact all the writing upon the various parts of the instrument may vary from time to time, as may be found most convenient, without departing from the real invention for the reason that the gist of the same lies not in the phraseology or arrangement of the words or parts employed, but in the combination of the checks with and as an integral part of the letter of credit, in such a manner that the former cannot be negotiated except by the production of the latter and the signing and detaching of the same in the presence of the banker to whom the checks are presented.

The method of using the credit is as follows: When the credit is delivered to a purchaser by the banker, the former is required to write his name upon the blank space left therefor, upon the "talon," and the credit is thereupon ready for use. When the holder desires to cash a check he presents the entire credit, to any one of the bankers named upon the indication list, who requires the holder to sign in his presence before it is detached any one of the checks he may designate and detaches it from the credit. If the signature thus signed agrees with that upon the "talon" of the credit, it will be obvious that the credit is in the hands of the person entitled to use it, and the banker is thus protected in paying the check so detached. The amount left available under the credit, will be at once apparent to the banker to whom it is next presented by the physical appearance of the credit, resultant from the number of checks that have already been detached, its shape and amount. The banker cashing any check is obliged to certify the payment of the same to the banker issuing the credit, by filling in the certificate upon the back of the check and when the check is presented for payment, the banker issuing the credit can at once determine from its number, date of certification and signatures of the traveler and banker cashing the same, all the necessary facts to protect himself against all attempts to use the same fraudulently. As soon as the checks are all cashed, the remaining part of the credit becomes available for the balance remaining payable under it and consequently when cashed must be returned to the banker, making such final payment.

I claim as my invention:

1. As a new article of manufacture, a circular letter of credit, printed on a single sheet of paper containing a credit or authorization to draw and one or more checks, which the person accredited by the letter of credit is authorized to draw.

2. The combination on a single sheet of paper with a credit of the kind known as a "circular credit," of checks separable therefrom to be signed by the person accredited as authorized to draw under it which on their face are non-negotiable apart from the credit.

3. The combination substantially as hereinbefore described, on a single sheet of paper, of a credit of the kind known as a circular credit, with any number of checks forming part thereof, so arranged that the removal and negotiation of any one of the same, shall, by changing the shape, size, and physical appearance of the letter of credit, reduce on its face, the amount remaining available to the drawee thereunder.

4. The combination substantially as hereinbefore set forth on a single sheet of paper of a credit of the kind known as a circular credit having on its face an authorization to draw to any given amount signed by the banker issuing the same, and on its back a list of bankers to whom the same is directed, of one or more checks, of any given amount forming part thereof and separable therefrom arranged to be signed by the person authorized by the credit to draw.

5. The combination substantially as hereinbefore set forth on a single sheet of paper, of a credit of the kind known as the circular credit, having on its face an authorization to draw to any given amount, signed by the banker issuing the same, and a space for the signature of the party to whom the same is issued and an advice note printed in connection therewith, and on its back a list of bankers to whom the same is directed; of one or more checks of any given amount forming part thereof and separable therefrom, arranged to be signed by the person authorized by the credit to draw, and on the reverse side thereof a certificate to be signed by the banker paying the check.

6. The combination with a credit substantially of the character indicated, of one or more checks forming a part thereof, each having on its face one or more spaces containing directions as to signing and detaching the check as may be directed by the banker negotiating the same.

7. The combination with a credit of the character indicated of one or more checks forming a part of the same, each having on its back a certificate to be signed by the banker negotiating the same.

8. The combination with a credit of the character indicated of one or more checks forming a part of the same each having on its face an order on the banker issuing the credit to pay, which on being detached from the credit indicates the amount still available thereunder.

9. The combination with a credit of the character indicated, of a space at one end of the main obligation for the signature of the bearer of the credit, so arranged that said signature when signed shall be inverted with respect to the printed or written matter upon all other parts of the credit, for the purposes set forth.

10. The combination with a credit of the character indicated, of one or more checks forming part of the same, each having on its back a certificate arranged to be signed by the banker cashing the same, setting forth the correct fulfillment of the requisite formalities for the negotiation thereof.

In testimony that I claim the foregoing as my invention I have signed my name, in presence of two witnesses, this 8th day of April, 1892.

HOWARD POTTER.

Witnesses:
WILLARD PARKER BUTLER,
EDWIN T. RICE, Jr.